United States Patent
Kim et al.

(10) Patent No.: US 9,575,351 B2
(45) Date of Patent: Feb. 21, 2017

(54) TOUCH SENSOR INTEGRATED TYPE DISPLAY DEVICE

(71) Applicant: LG Display Co., Ltd., Seoul (KR)

(72) Inventors: Juhan Kim, Gyeonggi-do (KR); Jinseong Kim, Gyeonggi-do (KR)

(73) Assignee: LG Display Co., Ltd., Seoul (KR)

(*) Notice: Subject to any disclaimer, the term of this patent is extended or adjusted under 35 U.S.C. 154(b) by 74 days.

(21) Appl. No.: 14/521,651

(22) Filed: Oct. 23, 2014

(65) Prior Publication Data
US 2015/0109548 A1 Apr. 23, 2015

(30) Foreign Application Priority Data

Oct. 23, 2013 (KR) .................. 10-2013-0126455

(51) Int. Cl.
| | |
|---|---|
| G02F 1/1333 | (2006.01) |
| G06F 3/041 | (2006.01) |
| G06F 3/044 | (2006.01) |
| G02F 1/1343 | (2006.01) |

(52) U.S. Cl.
CPC ........... *G02F 1/13338* (2013.01); *G06F 3/044* (2013.01); *G06F 3/0412* (2013.01); *G02F 2001/134372* (2013.01)

(58) Field of Classification Search
CPC ................ G02F 1/134336; G02F 1/13439
See application file for complete search history.

(56) References Cited

U.S. PATENT DOCUMENTS

| | | | | |
|---|---|---|---|---|
| 5,850,271 | A | * | 12/1998 | Kim .................. G02F 1/133512 |
| | | | | 349/106 |
| 2008/0129706 | A1 | | 6/2008 | Kim et al. |
| 2009/0323005 | A1 | | 12/2009 | Ota |
| 2010/0123680 | A1 | * | 5/2010 | Lee ........................ G06F 3/0412 |
| | | | | 345/174 |

(Continued)

FOREIGN PATENT DOCUMENTS

| | | | | |
|---|---|---|---|---|
| CN | 103941897 | * | 7/2014 | ............. G06F 3/041 |
| JP | 2001056746 A | | 2/2001 | |

(Continued)

OTHER PUBLICATIONS

Office Action issued in corresponding Japanese Patent Application No. 2014-208653 dated Aug. 25, 2015.

(Continued)

*Primary Examiner* — Sang V Nguyen
(74) *Attorney, Agent, or Firm* — Morgan, Lewis & Bockius LLP

(57) ABSTRACT

A touch sensor integrated type display device includes gate lines and data lines that cross over each other, pixel electrodes, first electrodes, second electrodes and shielding portions. The pixel electrodes are formed in areas defined by crossings of the gate lines and the data lines. The first electrodes at least partially overlap the pixel electrodes and are formed in parallel with the data lines. The second electrodes are formed in parallel with the gate lines between the pixel electrodes neighboring each other with the gate lines interposed therebetween. The shielding portions extend from the second electrodes in the spaces formed by the first electrodes arranged with the data lines interposed therebetween.

14 Claims, 9 Drawing Sheets

(56) References Cited

U.S. PATENT DOCUMENTS

| | | | |
|---|---|---|---|
| 2011/0157039 A1* | 6/2011 | Shin | G02F 1/13338 345/173 |
| 2011/0157504 A1* | 6/2011 | Kimura | G02F 1/133707 349/38 |
| 2011/0228188 A1* | 9/2011 | Kim | G02F 1/13338 349/43 |
| 2012/0026131 A1* | 2/2012 | Bytheway | G06F 3/044 345/174 |
| 2012/0050193 A1 | 3/2012 | Noguchi et al. | |
| 2012/0068944 A1* | 3/2012 | Oh | G02F 1/13338 345/173 |
| 2012/0227851 A1* | 9/2012 | Stroempl | F16L 11/125 138/137 |
| 2012/0313881 A1 | 12/2012 | Ge et al. | |
| 2013/0050628 A1* | 2/2013 | Takano | G02F 1/13338 349/143 |
| 2013/0314371 A1* | 11/2013 | Lee | G06F 3/0412 345/174 |
| 2013/0335365 A1* | 12/2013 | Kim | G06F 3/0412 345/174 |
| 2014/0160066 A1* | 6/2014 | Kim | G06F 3/0412 345/174 |
| 2014/0204055 A1* | 7/2014 | Lu | G06F 3/0412 345/174 |
| 2015/0085206 A1* | 3/2015 | Lee | G06F 3/0412 349/12 |

FOREIGN PATENT DOCUMENTS

| | | | | |
|---|---|---|---|---|
| JP | 2007-033979 A | | 2/2007 | |
| JP | 2010-008758 A | | 1/2010 | |
| JP | 2011-137882 A | | 7/2011 | |
| JP | 2012047801 A | | 3/2012 | |
| KR | 10-1318448 B1 | | 10/2013 | |
| TW | 102217826 | * | 9/2013 | G06F 3/041 |

OTHER PUBLICATIONS

Office Action dated May 24, 2016 from the Japanese Patent Office in counterpart Japanese Patent Application No. 2014-208653.

European Search Report dated May 4, 2015 for corresponding European Patent Application No. 14186154.2.

* cited by examiner

TOUCH SENSOR INTEGRATED TYPE DISPLAY DEVICE

This application claims the benefit of priority under 35 U.S.C. §119(a) to Korean Patent Application No. 10-2013-0126455 filed on Oct. 23, 2013, which is incorporated by reference herein in its entirety.

BACKGROUND

Field of the Invention

The present disclosure relates to a display device, and more particularly, to a touch sensor integrated type display device which is capable of recognizing a user's touch.

Discussion of the Related Art

Recently, various input devices such as a keyboard, a mouse, a trackball, a joystick, and a digitizer have been used to configure an interface between users and home appliances or various kinds of information communication equipment. However, such input devices as a keyboard, a mouse, etc. require the user to learn to use them and take up space. Therefore, the demand for input devices that are convenient and easy to use and reduce erroneous operations is growing more and more. In response to this demand, a touch sensor for enabling a user to input information by directly touching the screen with their hand or a pen was suggested.

The touch sensor is simple to use, has less malfunctions, and enables the user to input without using an additional input device. In addition, the touch sensor can be applied to various display devices because it enables the user to operate it quickly and easily through content displayed on the screen.

Touch sensors can be classified into add-on type and on-cell type. In the add-on type, a display device and a touch panel having a touch sensor are separately manufactured, and the touch panel is attached onto an upper substrate of the display device. In the on-cell type, a touch sensor is directly formed on the surface of an upper glass substrate of a display device.

However, the add-on type sensor has a structure in which the completed touch panel is mounted on the display device and has various problems, such as increased thickness or reduced visibility due to low brightness of the display device.

In addition, the on-cell type touch sensor has a structure in which a touch panel is formed on the upper surface of the display device and can have a reduced thickness compared to the add-on type but still has the problem of the increase in entire thickness due to a driving electrode layer, a sensing electrode layer, and an insulation layer for insulating the driving electrode layer and the sensing electrode layer, which constitute the touch sensor. As such, the number of processes and the manufacturing cost in the on-cell type touch sensor increase.

Accordingly, the need for a display device capable of solving the related art problems has arisen.

SUMMARY

Accordingly, the present invention is directed to a touch sensor integrated type display device that substantially obviates one or more of the problems due to limitations and disadvantages of the related art.

An object of the present invention is to provide a touch sensor integrated type display device which is reduced in thickness and requires a fewer number of processes by using touch driving electrodes and touch sensing electrodes for recognizing a touch on the display device as components of the display device as well.

Another object of the present invention is to provide a touch sensor integrated type display device capable of improving touch sensitivity by increasing mutual capacitance between touch driving electrodes and touch sensing electrodes.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a touch sensor integrated type display device includes: a plurality of gate lines and a plurality of data lines that cross over each other; a plurality of pixel electrodes formed in areas defined by crossings of the gate lines and the data lines; a plurality of first electrodes that at least partially overlap the pixel electrodes and are formed in parallel with the data lines; a plurality of second electrodes that are formed in parallel with the gate lines between the pixel electrodes neighboring each other with the gate lines interposed therebetween; and shielding portions that extend from the second electrodes in the spaces formed by the first electrodes arranged with the data lines interposed therebetween.

In another aspect, a touch sensor integrated type display device includes: a plurality of gate lines and a plurality of data lines that cross over each other; a plurality of pixel electrodes formed in areas defined by crossings of the gate lines and the data lines; a plurality of first electrodes that are formed in parallel with the gate lines between the pixel electrodes neighboring each other with the gate lines interposed therebetween; a plurality of second electrodes that at least partially overlap the pixel electrodes and are formed in parallel with the data lines; shielding portions that extend from the first electrodes in the spaces formed by the second electrodes arranged with the data lines interposed therebetween.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Figure 1:
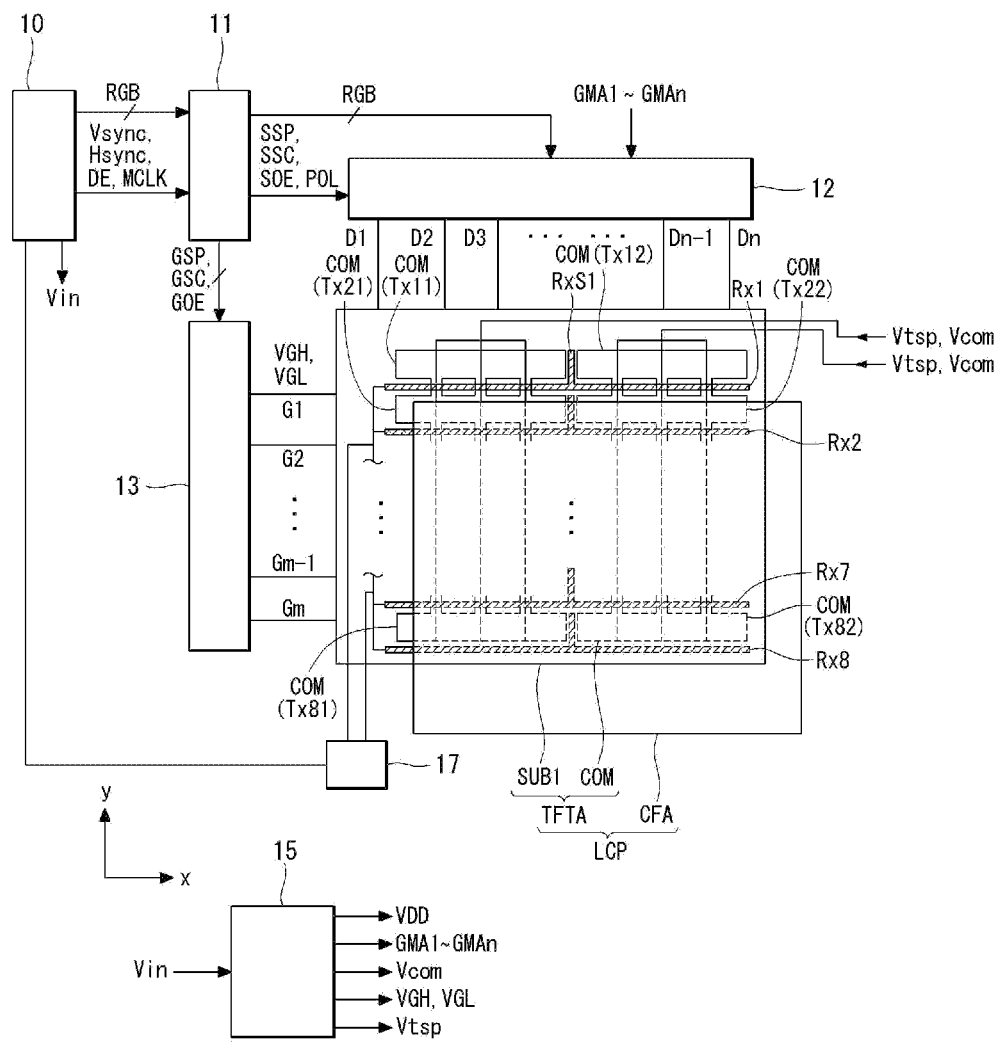
FIG. 1 is a block diagram schematically illustrating a touch sensor integrated type display device according to a first exemplary embodiment of the present invention.

Hereinafter, exemplary embodiments of this invention will be described in detail with reference to the accompanying drawings, wherein same reference numerals may be used to denote the same or substantially the same elements throughout the specification and the drawings.

Figure 2:
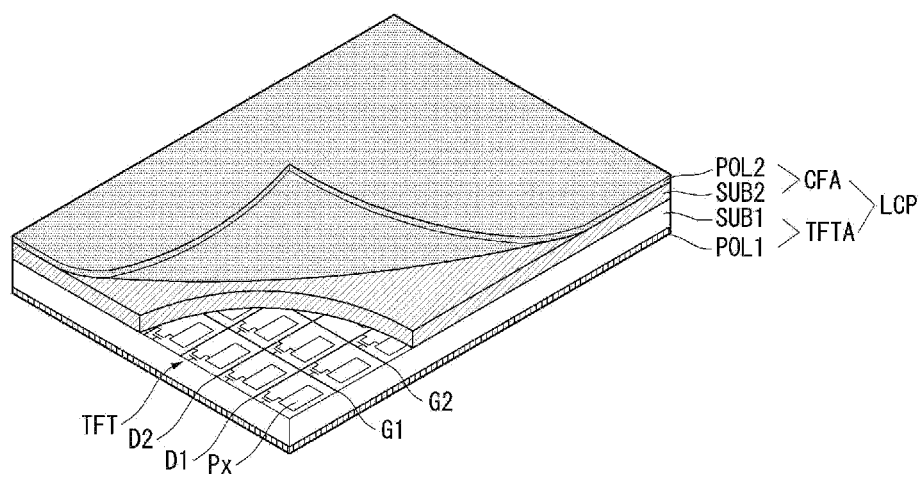
FIG. 2 is a partial exploded perspective view schematically showing the display device of FIG. 1.
Figure 3:
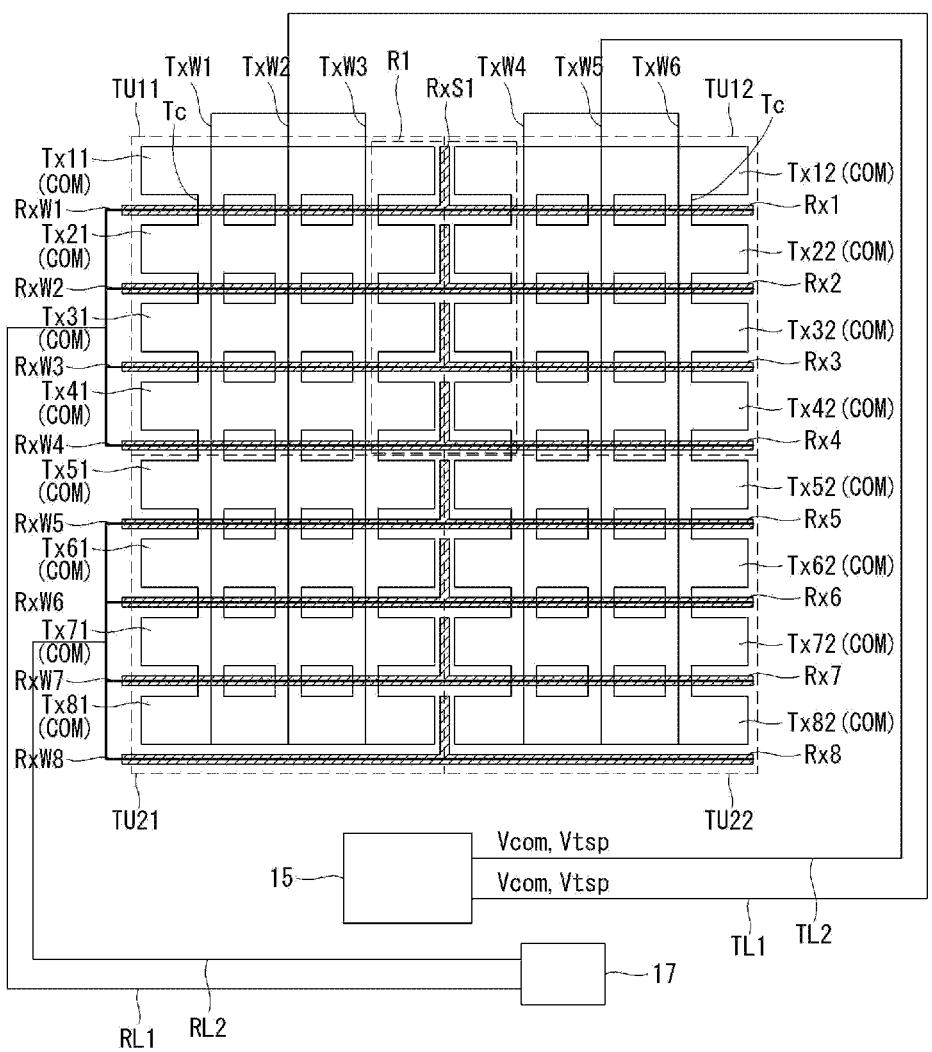
FIG. 3 is a schematic block diagram illustrating the relationship between touch driving electrodes and touch sensing electrodes of the touch sensor integrated type display device according to the first exemplary embodiment of the present invention.

A touch sensor integrated type display device according to a first exemplary embodiment of the present invention is described in detail with reference to FIGS. 1 to 3. FIG. 1 is a block diagram schematically illustrating a touch sensor integrated type display device according to a first exemplary embodiment of the present invention. FIG. 2 is a partial exploded perspective view schematically showing the display device of FIG. 1. FIG. 3 is a schematic block diagram illustrating the relationship between touch driving electrodes and touch sensing electrodes of the touch sensor integrated type display device according to the exemplary embodiment of the present invention shown in FIG. 1.

In the following description, a touch sensor integrated type liquid crystal display device is used as an example of the touch sensor integrated type display device.

With reference to FIGS. 1 and 2, a touch sensor integrated type liquid crystal display device according to an exemplary embodiment of the present invention comprises a liquid crystal display panel LCP, a host controller 10, a timing controller 11, a data driver 12, a gate driver 13, a power supply unit 15, and a touch recognition processor 17.

The liquid crystal display panel LCP comprises a color filter array CFA and a thin film transistor array TFTA with a liquid crystal layer (not shown) interposed therebetween.

The thin film transistor array TFTA comprises a plurality of gate lines G1, G2, ..., Gm which are formed in parallel on a first substrate SUB1 in a first direction (for example, x-axis direction), a plurality of data lines D1, D2, ..., Dn which are formed in parallel in a second direction (for example, y-axis direction) to cross over the plurality of gate lines G1, G2, ..., Gm, thin film transistors TFT formed at crossings of the gate lines G1, G2, ..., Gm and the data lines D1, D2, ..., Dn, a plurality of pixel electrodes Px for charging a data voltage to liquid crystal cells, and a plurality of common electrodes COM positioned opposite the plurality of pixel electrodes Px.

The color filter array CFA comprises a black matrix and color filters (not shown) formed on a second substrate SUB2. Polarizing plates POL1 and POL2 are respectively attached to outer surfaces of the first substrate SUB1 and second substrate SUB2 of the liquid crystal display panel LCP. Alignment layers (not shown) for setting a pre-tilt angle of liquid crystals are respectively formed on inner surfaces of the first substrate SUB1 and the second substrate SUB2 contacting the liquid crystals. A column spacer may be formed between the first substrate SUBS1 and second substrate SUBS2 of the liquid crystal display panel LCP to maintain cell gaps of the liquid crystal cells.

A backlight unit (not shown) is disposed under the thin film transistor array TFTA. The backlight unit comprises a plurality of light sources to uniformly irradiate light onto the thin film transistor array TFTA and the color filter array CFA. The backlight unit may be implemented as either an edge type backlight unit or a direct type backlight unit. The light sources of the backlight unit may comprise one or at least two of a hot cathode fluorescent lamp (HCFL), a cold cathode fluorescent lamp (CCFL), an external electrode fluorescent lamp (EEFL), and a light emitting diode (LED).

The common electrodes COM are formed on the second substrate SUB2 in a vertical electric field driving manner such as a twisted nematic (TN) mode and a vertical alignment (VA) mode. On the other hand, the common electrodes COM are formed on the first substrate SUB1 along with the pixel electrodes Px in a horizontal electric field driving manner such as an in-plane switching (IPS) mode and a fringe field switching (FFS) mode. In the exemplary embodiment of the invention, the common electrodes COM in the horizontal electric field driving manner are described as an example.

FIG. 3 is a top plan view schematically illustrating the relationship between touch driving electrodes and touch sensing electrodes of the touch sensor integrated type display device according to the first exemplary embodiment of the present invention.

With reference to FIG. 3, the common electrodes COM of the touch sensor integrated type display device according to the first exemplary embodiment of the present invention comprise a plurality of electrodes Tx11, Tx12, Tx21, TX22, ..., Tx81, Tx82 divided in the first direction (for example, x-axis direction) and the second direction (for example, y-axis direction). Among these electrodes, the electrodes interconnected in the y-axis direction and constituting a plurality of columns also serve as a plurality of touch driving electrodes Tx11, Tx21, ..., Tx81; and Tx12, Tx22, ..., Tx82 constituting a touch sensor.

More specifically, the first touch driving electrodes of the first column connected in the y-axis direction, among the plurality of touch driving electrodes Tx11, Tx21, ..., Tx81 and Tx12, Tx22, ..., Tx82, are formed in such a manner that neighboring first touch driving electrodes are interconnected by at least one connecting portion Tc. First resistance reducing wires TxW1, TxW2, and TxW3 for reducing resistance are formed on the first touch driving electrodes Tx11, Tx21, ..., Tx81. Likewise, the second touch driving electrodes of the second column connected in the y-axis direction are formed in such a manner that neighboring second touch driving electrodes are interconnected by at least one connecting portion Tc. Second resistance reducing wires TxW4, TxW5, and TxW6 for reducing resistance are formed on the second touch driving electrodes Tx12, Tx22, ..., Tx82. The first and second resistance reducing wires TxW1 to TxW3 and TxW4 to TxW6 are respectively connected to the power supply unit 15 via first routing wires TL1 and TL2.

The embodiment shown in FIG. 3 illustrates an example in which the touch driving electrodes comprises two touch driving lines. That is, the embodiment shown in FIG. 3 illustrates an example in which one touch driving line is constituted by the first touch driving electrodes Tx11, Tx21, . . . , Tx81 and the first resistance reducing wires TxW1, TxW2, and TxW3, and the other touch driving line is constituted by the second touch driving electrodes Tx12, Tx22, . . . , Tx82 and the second resistance reducing wires TxW4, TxW5, and TxW6.

In a touch driving operation, a touch driving voltage Vtsp is supplied to the first and second touch driving electrodes Tx11, Tx21, . . . , Tx81; and Tx12, Tx22, . . . , Tx82 from the power supply unit 15. In a display driving operation, a common voltage Vcom is supplied to the first and second touch driving electrodes Tx11, Tx21, . . . , Tx81; and Tx12, Tx22, . . . , Tx82 from the power supply unit 15. Accordingly, the first and second touch driving electrodes Tx11, Tx21, . . . , Tx81; and Tx12, Tx22, . . . , Tx82 serve as touch driving electrodes when the touch driving voltage Vtsp is applied and as common electrodes when the common voltage Vcom is applied.

In the first exemplary embodiment of the present invention described above, three first resistance reducing wires TxW1, TxW2, and TxW3 are used to constitute the first touch driving lines Tx11, Tx21, . . . , Tx81, TxW1, TxW2, and TxW3, and three second resistance reducing wires TxW4, TxW5, and TxW6 are used to constitute the second touch driving lines Tx12, Tx22, . . . , Tx82, TxW4, TxW5, and TxW6. However, this invention is not limited thereto. For example, one or two resistance reducing wires may be used to constitute each of the touch driving lines. Otherwise, four and more resistance reducing wires may be used to constitute each of the touch driving lines.

On the other hand, touch sensing electrodes Rx1, Rx2, . . . , Rx8 constituting the touch sensor are arranged in the first direction (for example, x-axis direction) to cross over the first and second resistance reducing wires TxW1, TxW2 and TxW3; and TxW4, TxW5 and TxW6 between the touch driving electrodes Tx11, Tx12 and Tx21, Tx22; Tx21, Tx22 and Tx31, Tx32; Tx31, Tx32 and Tx41, Tx42; Tx41, Tx42 and Tx51, Tx52; Tx51, Tx52 and Tx61, Tx62; Tx61, Tx62 and Tx71, Tx72; and Tx71, Tx72 and Tx81, Tx82. Each of the touch sensing electrodes Rx1, Rx2, . . . , Rx8 further comprises a shielding portion RxS1 extending between the divided first and second touch driving electrodes Tx11, Tx12 and Tx21, Tx22; Tx21, Tx22 and Tx31, Tx32; Tx31, Tx32 and Tx41, Tx42; Tx41, Tx42 and Tx51, Tx52; Tx51, Tx52 and Tx61, Tx62; Tx61, Tx62 and Tx71, Tx72; and Tx71, Tx72 and Tx81, Tx82. According to this configuration, a plurality of shielding portions RxS1 extending from the touch sensing electrodes Rx1, Rx2, . . . , Rx8 are arranged in the spaces between the first touch driving electrodes Tx11, Tx21, . . . , Tx81 and the second touch driving electrodes Tx12, Tx22, . . . , Tx82 neighboring each other.

Another resistance reducing wires RxW1, RxW2, . . . , RxW8 are formed on the touch sensing electrodes Rx1, Rx2, . . . , Rx8, respectively. Although FIG. 3 illustrates that the resistance reducing wires RxW1, RxW2, . . . , RxW8 are not formed at the shielding portions RxS1, the resistance reducing wires are preferably formed at the shielding portions RxS1, respectively, for resistance reduction. Also, the touch sensing electrodes Rx1, Rx2, . . . , Rx8 are separated from each other, but they may be grouped into four units by the third to sixth resistance reducing wires RxW1 to RxW4 and the seventh to tenth resistance reducing wires RxW5 to RxW8 to form first touch sensing lines Rx1 to Rx4 and RxW1 to RxW4 and second touch sensing lines Rx5 to Rx8 and RxW5 to RxW8. The first touch sensing lines Rx1 to Rx4 and RxW1 to RxW4 and the second touch sensing lines Rx5 to Rx8 and RxW5 to RxW8 are connected to the touch recognition processor 17 via second routing wires RL1 and RL2.

The touch sensing electrodes Rx1 to Rx8 are connected to the touch recognition processor 17, thereby enabling the touch recognition processor 17 to measure a capacitance change before and after a touch and detecting the touch position.

The touch sensor according to the first exemplary embodiment of this invention comprises the touch driving electrodes Tx11, Tx21, . . . , Tx81; and Tx12, Tx22, . . . , Tx82, and the touch sensing electrodes Rx1, Rx2, . . . , Rx8. Unit touch recognition blocks for touch recognition may be formed by appropriately grouping the touch driving electrodes and the touch sensing electrodes using the first and second resistance reducing wires and the third and fourth resistance reducing wires. FIG. 3 illustrates an example in which four unit touch recognition blocks TU11, TU12, TU21, and TU22 are formed by eight touch sensing electrodes Rx1 to Rx8 and sixteen touch driving electrode Tx11, Tx21, . . . , Tx81; and Tx12, Tx22, . . . , Tx82.

In more detail, the first touch recognition block TU11 is formed by the first touch driving electrodes Tx11, Tx21, Tx31, and Tx41 and the first touch sensing electrodes Rx1, Rx2, Rx3, and Rx4 which are connected to each other, the second touch recognition block TU12 is formed by the second touch driving electrodes Tx12, Tx22, Tx32, and Tx42 and the first touch sensing electrodes Rx1, Rx2, Rx3, and Rx4 which are connected to each other, the third touch recognition block TU21 is formed by the third touch driving electrodes Tx51, Tx61, Tx71, and Tx81 and the second touch sensing electrodes Rx5, Rx6, Rx7, and Rx8 which are connected to each other, and the fourth touch recognition block TU22 is formed by the fourth touch driving electrodes Tx52, Tx62, Tx72, and Tx82 and the second touch sensing electrodes Rx5, Rx6, Rx7, and Rx8 which are connected to each other.

All of the above-explained touch driving electrodes Tx11, Tx21, . . . , Tx81; and Tx12, Tx22, . . . , Tx82 also serve as common electrodes COM and are formed on the first substrate SUB1 along with the pixel electrodes Px in a horizontal electrical field driving type display device. The pixel electrodes Px are formed in areas defined by the crossing of the gate lines G1 to Gm and the data lines D1 to Dn.

The touch driving electrodes Tx11, Tx12, Tx21, Tx22, . . . , Tx81, Tx82 also serving as common electrodes COM may correspond one-to-one with unit pixel electrodes (each consisting of a plurality of subpixels required to represent colors), or one touch driving electrode may correspond to n unit pixel electrodes (n is a natural number equal to or greater than 2).

As described above, in the touch sensor integrated type display device according to the first exemplary embodiment of the present invention, the touch driving electrodes and the unit pixel electrodes may have a one-to-one or one-to-n relationship. Also, the first and second resistance reducing wires TxW1, TxW2, and TxW3; and TxW4, TxW5, and TxW6 may correspond one-to-one with the data lines D1 to Dn, or one resistance reducing wire may correspond to n data lines. Also, the touch sensing electrodes Rx1 to Rx8 may correspond one-to-one with the gate lines, or one touch sensing electrode may correspond to n gate lines.

Accordingly, the touch sensor integrated type display device according to the first exemplary embodiment of the present invention has the advantage of facilitating the design of touch driving electrodes, touch sensing electrodes, and wiring which constitute a touch sensor, in conformity with the design of unit pixel electrodes, gate lines, and data lines of the display device. Furthermore, the touch sensor integrated type display device according to the first exemplary embodiment of the present invention has the advantage of improving touch sensitivity by increasing mutual capacitance between touch driving electrodes and touch sensing electrodes because forming the touch driving electrodes and the touch sensing electrodes based on unit pixel electrodes can sharply increase their numbers. Furthermore, the touch sensor integrated type display device according to the first exemplary embodiment of the present invention has the advantage of preventing light leakage caused by a liquid-crystal behavior which occurs due to an electric field formed between data lines and common electrodes (or pixel electrodes) by arranging shielding portions extending from touch sensing electrodes in the spaces between divided common electrodes, i.e., the first and second touch driving electrodes, and shielding the electric field formed between the data lines and the common electrodes (touch driving electrodes).

Next, with reference to FIGS. 4A and 4B, the touch sensor integrated type display device according to the first exemplary embodiment of the present invention will be described in more detail.

Figure 4A:
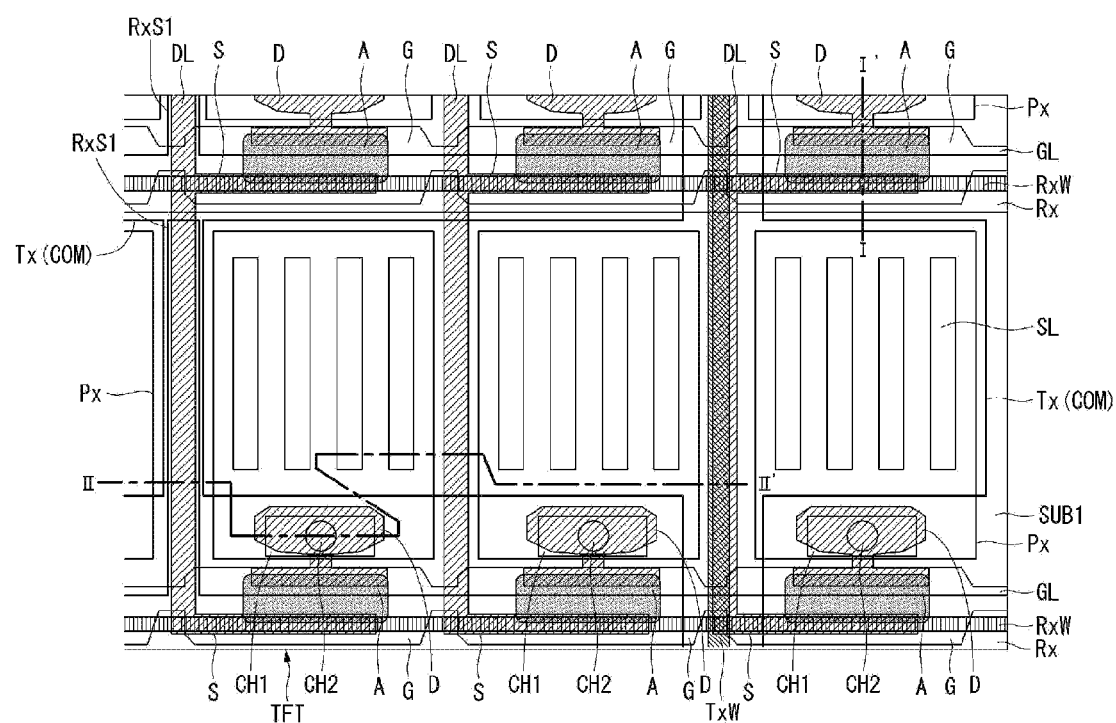
FIG. 4A is a top plan view illustrating part of the touch sensor integrated type display device according to the first exemplary embodiment of the present invention.
Figure 4B:
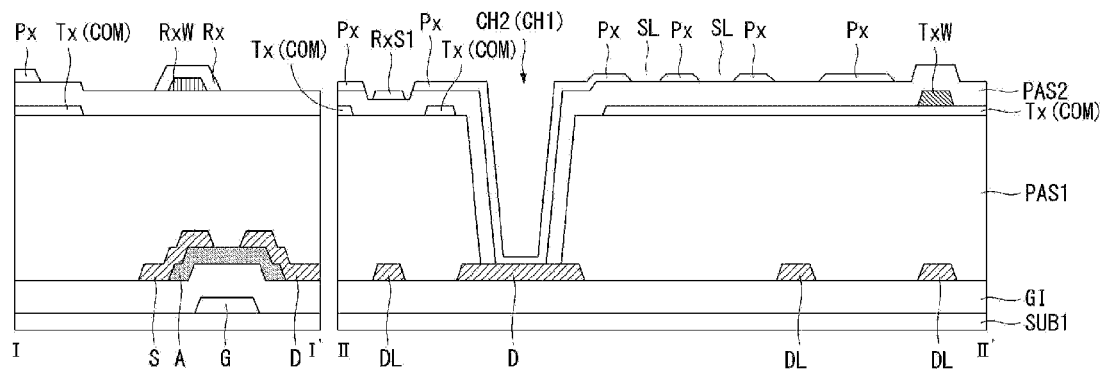
FIG. 4B is a cross-sectional view taken along the line I-I' and the line II-II shown in FIG. 4A.

With reference to FIGS. 4A and 4B, the touch sensor integrated type display device according to the first exemplary embodiment of the present invention comprises gate lines GL and data lines DL formed on substrate SUB 1 of a thin film transistor array TFTA to cross over each other, thin film transistors TFTs formed at crossings of the gate lines GL and the data lines DL, pixel electrodes Px formed in areas which are defined by crossings of the gate lines GL and the data lines DL, and common electrodes COM positioned opposite the pixel electrodes Px. In the first exemplary embodiment of the present invention, the common electrodes COM also serve as touch driving electrodes Tx. Accordingly, the common electrodes COM are also referred to as touch driving electrodes Tx, touch driving electrodes Tx also serving as common electrodes, or common electrodes COM also serving as touch driving electrodes as appropriate.

In this configuration, a thin film transistor TFT comprises a gate electrode G extending from a gate line GL, an active layer A formed in an area corresponding to the gate electrode G on a gate insulation layer GI covering the gate line GL and the gate electrode G, a data line DL formed on a first passivation layer PAS1 covering the active layer A, a source electrode S extending from the data line DL, and a drain electrode D positioned opposite the source electrode S.

Although this embodiment has been described with respect to a thin film transistor having a gate bottom structure where a gate electrode is formed under source/drain electrodes, the present invention is not limited thereto and it should be understood that the present invention also involves a thin film transistor having a gate top structure where a gate electrode is formed over source/drain electrodes. The thin film transistor having a gate top structure is a well-known component, so a detailed description thereof will be omitted.

Common electrodes COM also serving as touch driving electrodes Tx are formed on the first passivation layer PAS1 covering the thin film transistors TFT and the data lines DL. In the embodiment shown in FIGS. 4A and 4B, one touch driving electrode Tx is formed corresponding to a unit pixel consisting of three subpixels Px, but this invention is not limited thereto. For example, a unit pixel may consist of four subpixels comprising a red subpixel, a green subpixel, a blue subpixel, and a white subpixel which are required to represent colors, and the number of subpixels is not specially limited as long as colors can be mixed together. One touch driving electrode Tx may correspond to n subpixels or n unit pixels.

First and second resistance reducing wires (hereinafter, referred to as 'driving electrode resistance reducing wires TxW') are formed on the touch driving electrodes Tx in a direction (y-axis direction) in which the touch driving electrodes are connected, thereby reducing the resistance of the touch driving electrodes T11, T21, . . . , T81 and T12, T22, . . . , T82.

A second passivation layer PAS2 is formed on the entire surface of the first passivation layer PAS1 on which the driving electrode resistance reducing wires TxW and the touch driving electrodes Tx are formed. First and second contact holes CH1 and CH2 passing through the first and second passivation layer PAS1 and PAS2 are formed to expose part of the drain electrode D.

Third and fourth resistance reducing wires (hereinafter, referred to as 'sensing electrode resistance reducing wire RxW') are formed in parallel with the gate lines GL (along the x axis) on the second passivation PAS2 where the first and second contact holes CH1 and CH2 are formed. Pixel electrodes Tx are respectively formed in pixel areas defined by crossings of the data lines DL and the gate lines GL on the second passivation layer PAS2 where the sensing electrode resistance reducing wires RxW are formed. The touch sensing electrodes Rx are formed in parallel with the gate lines GL to cover the sensing electrode resistance reducing wires RxW between vertically neighboring pixel electrodes Px. The touch sensing electrodes Rx comprise shielding portions RxS1 which are arranged in the spaces between the divided touch driving electrodes Tx and extend along the data lines DL while overlapping the data lines DL. According to this configuration, the shielding portions RxS1 are formed on a different layer from the touch driving electrodes Tx, but are arranged between neighboring pixel electrodes Px on the same layer as the pixel electrodes Px.

In the touch sensor integrated type display device according to the first exemplary embodiment of the invention, as shown in FIGS. 4A and 4B, the touch driving electrodes Tx formed on the first passivation layer PAS1 have no slits, and the pixel electrodes Px formed on the second passivation layer PAS2 have slits.

In the embodiment shown in FIGS. 4A and 4B, the touch driving electrodes Tx is formed on the first passivation layer PAS1, and the pixel electrodes Px is formed on the second passivation layer PAS2. But the invention is not limited thereto. For example, the touch driving electrodes Tx is formed on the second passivation layer PAS2, and the pixel electrodes Px is formed on the first passivation layer PAS2. In this case, the touch driving electrodes Tx may have slits, and the pixel electrodes Px may have no slits.

In the above-described configuration, the shielding portions RxS1 extending from the touch sensing electrodes Rx are formed at positions overlapping the data lines DL. Accordingly, an electric field formed between the data lines DL and the touch driving electrodes (common electrodes)

Tx or an electric field formed between the data lines DL and the pixel electrodes Px is shielded by the shielding portions RxS1 and therefore does not affect the behavior of liquid crystals during a display driving operation. This prevents light leakage through the spaces between the divided common electrodes, i.e., the touch driving electrodes.

With further reference to FIGS. 1 and 2, the gate driver 13 sequentially outputs gate pulses (or scan pulses) in a display mode under the control of the timing controller 11, and shifts the swing voltage of the output to a gate high voltage VGH and a gate low voltage VGL. The gate pulses output from the gate driver 13 are sequentially supplied to the gate lines G1 to Gm in synchronization with a data voltage output from the data driver 12. The gate high voltage VGH is a voltage higher than the threshold voltage of the thin film transistors TFT, and the gate low voltage VGL is a voltage lower than the threshold voltage of the thin film transistors TFT. Gate driving ICs (integrated circuits) may be connected to the gate lines G1 to Gm formed on the first substrate SUB1 of the thin film transistor array TFTA through a TAP (Tape Automated Bonding) process, or formed directly on the first substrate SUB1 of the thin film transistor array TFTA together with the pixels through a GIP (Gate In Panel) process.

The data driver 12 samples and latches digital video data RGB under the control of the timing controller 11. The data driver 12 outputs positive/negative data voltages by inverting the polarity of a data voltage of digital video data RGB based on positive/negative gamma compensation voltages GMA1 to GMAn supplied from the power supply unit 15. The positive/negative data voltages output from the data driver 12 are synchronized with the gate pulses output from the gate driver 13. Source driving ICs of the data driver 12 may be connected to the data lines D1 to Dn of a display unit through a chip-on glass (COG) process or the TAB process. The source driving ICs may be integrated inside the timing controller 11 and thus may be implemented as a single chip IC along with the timing controller 11.

The timing controller 11 generates timing control signals for controlling operation timings of the gate driver 13 and the data driver 12 by using timing signals, which are supplied from an external host controller 10 and required to drive the display device. The timing control signals for controlling operation timings of the gate driver 13 and data driver 12 include a gate timing control signal for controlling the operation timing of the gate driver 13 and a data timing control signal for controlling the operation timing of the data driver 12 and the polarity of the data voltage.

The gate timing control signal includes a gate start pulse GSP, a gate shift clock GSC, a gate output enable signal GOE, and the like. The gate start pulse GSP is applied to a first gate driving IC of the gate driver 13 to output the first gate pulse in each frame period, and controls a shift start timing of the first gate driving IC. The gate shift clock GSC is commonly input into the gate driving ICs of the gate driver 13 and shifts the gate start pulse GSP. The gate output enable signal GOE controls output timings of the gate driving ICs of the gate driver 13.

The data timing control signal includes a source start pulse SSP, a source sampling clock SSC, a polarity control signal POL, a source output enable signal SOE, and the like. The source start pulse SSP is applied to a first source driving IC of the data driver 12 to sample the first data and controls a data sampling start timing. The source sampling clock SSC is a clock signal that controls a sampling timing of data inside the source driving ICs based on a rising or falling edge thereof. The polarity control signal POL controls the polarity of the data voltage output from the source driving ICs. The source output enable signal SOE controls output timings of the source driving ICs. If the digital video data RGB is input to the data driver 12 through a mini low voltage differential signaling (LVDS) interface, the source start pulse SSP and the source sampling clock SSC may be omitted.

The power supply unit 15 is implemented as a DC-DC converter comprising a pulse width modulation (PWM) circuit, a boost converter, a regulator, a charge pump, a voltage divider, an operation amplifier, etc. The power supply unit 15 regulates a voltage input from the host controller and generates voltages required to drive the liquid crystal display panel LCP, the data driver 12, the gate driver 13, the timing controller 11, and the backlight unit (not shown).

The voltages generated by the power supply unit 15 include a high potential power voltage VDD, the gate high voltage VGH, the gate low voltage VGL, a common voltage Vcom, positive and negative gamma reference voltages VGMA1 to VGMAn, a touch driving voltage Vtsp, and the like. Among these voltages, the common voltage Vcom is supplied to all the common electrodes COM under the control of the host controller 10 during a display driving operation. Alternatively, the common voltage Vcom may be supplied to all the common electrodes COM under the control of the timing controller 11. Meanwhile, the touch driving voltage Vtsp is supplied to the first and second touch driving electrodes T11, T21, . . . , T81; and T12, T22, . . . , T82 under the control of the host controller 10 during a touch driving operation. Alternatively, the touch driving voltage Vtsp may be supplied to the first and second touch driving electrodes T11, T21, . . . , T81; and T12, T22, . . . , T82 under the control of the timing controller 11. Although the exemplary embodiment of the present invention shown in FIG. 1 illustrates that the touch driving voltage Vtsp is supplied to the first and second touch driving electrodes T11, T21, . . . , T81; and T12, T22, . . . , T82 through the power supply unit 15, the present invention is not limited thereto. For example, the touch driving voltage Vtsp may be supplied to the first and second touch driving electrodes T11, T21, . . . , T81; and T12, T22, . . . , T82 through the touch recognition processor 17, which is controlled by the host controller 10 or the timing controller 11.

The host controller 10 transfers the digital video data RGB of an input image and the timing signals Vsync, Hsync, DE, and MCLK required for a display driving operation to the timing controller 11 through an interface, such as a low voltage difference signaling (LVDS) interface and a transition minimized differential signaling (TMDS) interface. During the display driving operation for displaying an image on the screen of the liquid crystal display device, the host controller 10 supplies a control signal Vin to the power supply unit 15 so as to supply the same common voltage Vcom to the plurality of divided common electrodes COM. During the touch driving operation for touch recognition, a control signal Vin is supplied to the power supply unit 15 so as to supply the touch driving voltage Vtsp to the touch driving electrodes T11, T21, . . . , T81; and T12, T22, . . . , T82.

The touch recognition processor 17 differentially amplifies a voltage of initial electrostatic capacitance of each of the touch sensing electrodes Rx1 to Rx8 before a touch event and a voltage of touch electrostatic capacitance thereof after the touch event and converts the result into digital data. The touch recognition processor then detects a touch position based on a difference between the initial electrostatic capacitance and touch electrostatic capacitance of each of the touch sensing electrodes Rx1 to Rx8 by using a touch recognition algorithm, and outputs touch coordinate data indicating the touch position to the host controller 10.

As described above, the first and second touch driving electrodes Tx11, Tx21, . . . , Tx81; and Tx12, Tx22, . . . , Tx82 according to one embodiment of this invention constitute touch driving lines in the y-axis direction, and the touch sensing electrodes Rx1 to Rx8 constitute touch sensing lines in the x-axis direction so that they cross over each other. Accordingly, when the display device is touched, a change is made to the mutual capacitance between the touch sensing lines and the touch driving lines. It is possible to detect the touch position by measuring the mutual capacitance change.

In particular, it is possible to improve touch sensitivity by increasing mutual capacitance between the touch driving electrodes and the touch sensing electrodes because the number of touch driving electrodes and touch sensing electrodes can be increased by forming each touch driving electrode to correspond to a plurality of subpixel electrodes or a unit pixel electrode and forming each touch sensing electrode to correspond to a single gate line.

Furthermore, it is possible to easily manufacture a touch sensor integrated type display device having various unit touch recognition blocks because the size of a unit touch recognition block (basic unit for touch recognition) can be properly adjusted as needed by using the driving electrode resistance reducing wires and the sensing electrode resistance reducing wires.

Furthermore, it is possible to prevent light leakage through the spaces between the divided common electrodes, i.e., the touch driving electrodes, by forming shielding portions extending from the touch sensing electrodes at positions overlapping the data lines DL.

While the touch sensor integrated type display device according to the first exemplary embodiment of the present invention has been described with respect to an example where the common electrodes COM serve as the touch driving electrodes Tx, the common electrodes COM may be connected to the power supply unit 15 to receive a common voltage during a display driving operation and connected to the touch recognition processor 17 to serve as the touch sensing electrodes Rx during a touch sensing operation.

Figure 5:
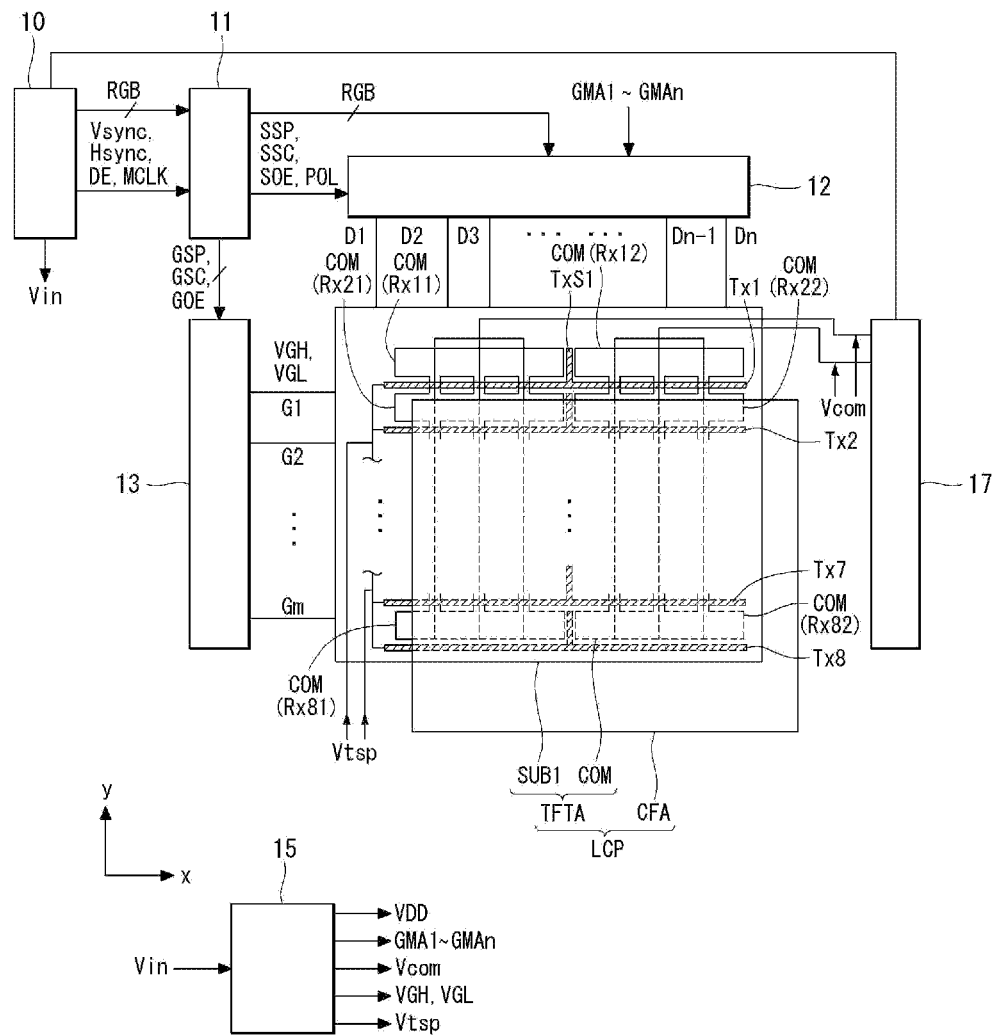
FIG. 5 is a schematic block diagram illustrating a touch sensor integrated type display device according to a second exemplary embodiment of the present invention.
Figure 6:
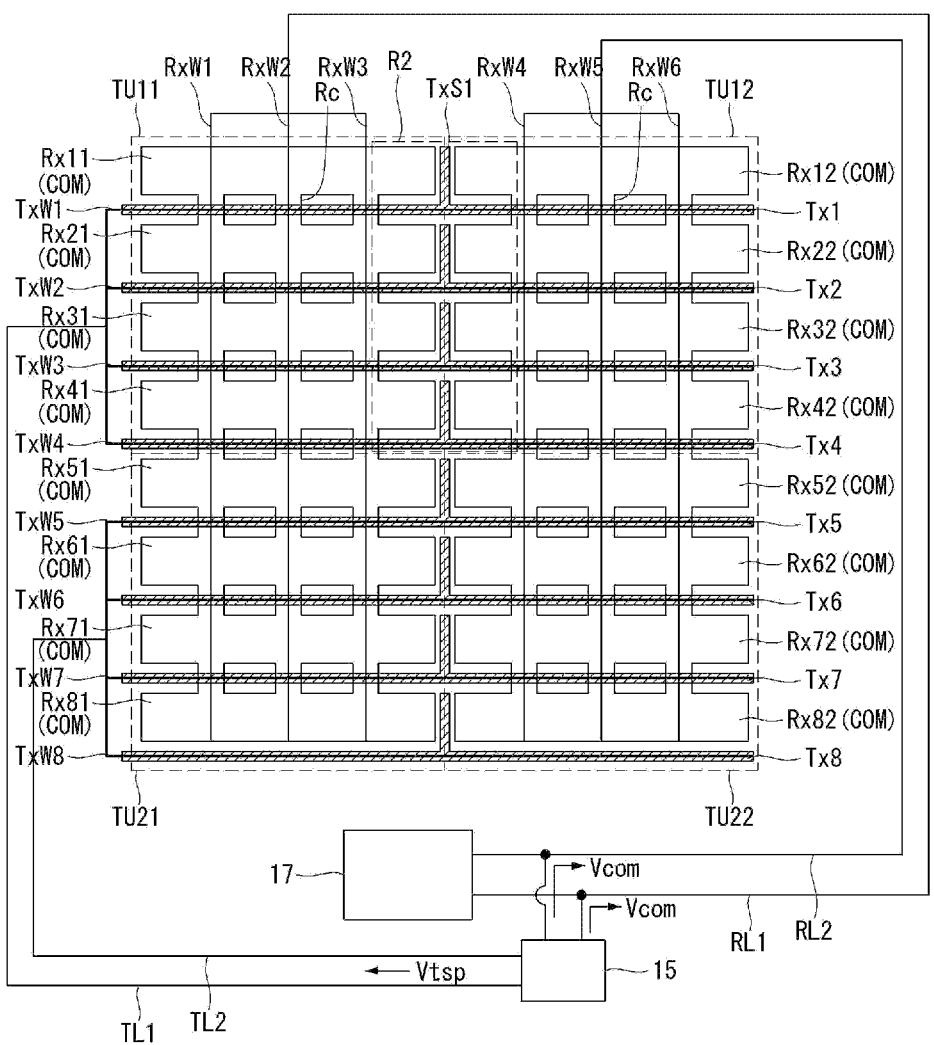
FIG. 6 is a schematic block diagram illustrating the relationship between touch driving electrodes and touch sensing electrodes of the touch sensor integrated type display device according to the second exemplary embodiment of the present invention.

Next, a touch sensor integrated type display device according to a second exemplary embodiment of the present invention will be described with reference to FIGS. 5 and 6. FIG. 5 is a schematic block diagram illustrating a touch sensor integrated type display device according to a second exemplary embodiment of the present invention. FIG. 6 is a schematic block diagram illustrating the relationship between touch driving electrodes and touch sensing electrodes of the touch sensor integrated type display device according to the second exemplary embodiment of the present invention.

With reference to FIGS. 5 and 6, the touch sensor integrated type liquid crystal display device according to the second exemplary embodiment of the present invention comprises a liquid crystal display panel LCP, a host controller 10, a timing controller 11, a data driver 12, a gate driver 13, a power supply unit 15, and a touch recognition processor 17.

In the touch sensor integrated type liquid crystal display device according to the second exemplary embodiment of the present invention, general information on the liquid crystal display LCP and the functionalities of the host controller 10, timing controller 11, data driver 12, gate driver 13, power supply unit 15, and touch recognition processor 17 for display and touch driving operations are identical to those of the touch sensor integrated type liquid crystal display device according to the first exemplary embodiment of the present invention, so descriptions thereof will be omitted.

The common electrodes COM of the touch sensor integrated type display device according to the second exemplary embodiment of the present invention comprise a plurality of electrodes Rx11, Rx12, Rx21, RX22, . . . , Rx81, Rx82 divided in the first direction (for example, x-axis direction) and the second direction (for example, y-axis direction). Among these electrodes, the electrodes interconnected in the y-axis direction and constituting a plurality of columns also serve as a plurality of touch sensing electrodes Rx11, R12, Rx21, Rx22, . . . , Rx81, Rx82 constituting a touch sensor.

More specifically, the first touch sensing electrodes of the first column connected in the y-axis direction, among the plurality of touch sensing electrodes Rx11, Rx21, . . . , Rx81 and Rx12, Rx22, . . . , Rx82, are formed in such a manner that neighboring first touch sensing electrodes are interconnected by at least one connecting portion Tc. First resistance reducing wires RxW1, RxW2, and RxW3 for reducing resistance are formed on the first touch sensing electrodes Rx11, Rx21, . . . , Rx81. Likewise, the second sensing electrodes of the second column connected in the y-axis direction are formed in such a manner that neighboring second touch sensing electrodes are interconnected by at least one connecting portion Tc. Second resistance reducing wires RxW4, RxW5, and RxW6 for reducing resistance are formed on the second touch sensing electrodes Rx12, Rx22, . . . , Rx82. The first and second resistance reducing wires RxW1 to RxW3 and RxW4 to RxW6 are respectively connected to the power supply unit 15 and the touch recognition processor 17 via first routing wires RL1 and RL2.

The second exemplary embodiment shown in FIG. 8 illustrates an example in which the touch sensing electrodes comprises two touch sensing lines. That is, the embodiment shown in FIG. 6 illustrates an example in which one touch sensing line is constituted by the first touch sensing electrodes Rx11, Rx21, . . . , Rx81 and the first resistance reducing wires RxW1, RxW2, and RxW3, and the other touch sensing line is constituted by the second touch sensing electrodes Rx12, Rx22, . . . , Rx82 and the second resistance reducing wires RxW4, RxW5, and RxW6.

In a display driving operation, a common voltage Vcom is supplied to the first and second touch sensing electrodes Rx11, Rx21, . . . , Rx81; and Rx12, Rx22, . . . , Rx82 from the power supply unit 15. In a touch driving operation, a sensing voltage is supplied to the touch recognition processor 17 from the first and second touch sensing electrodes Rx11, Rx21, . . . , Rx81; and Rx12, Rx22, . . . , Rx82. Accordingly, the first and second touch sensing electrodes Rx11, Rx21, . . . , Rx81; and Rx12, Rx22, . . . , Rx82 serve as touch sensing electrodes during a touch driving operation.

In the second exemplary embodiment of the present invention described above, three first resistance reducing wires RxW1, RxW2, and RxW3 are used to constitute the first touch sensing lines Rx11, Rx21, . . . , Rx81, RxW1, RxW2, and RxW3, and three second resistance reducing wires RxW4, RxW5, and RxW6 are used to constitute the second touch sensing lines Rx12, Rx22, . . . , Rx82, RxW4, RxW5, and RxW6. However, this invention is not limited thereto. For example, one or two resistance reducing wires may be used to constitute each of the touch sensing lines.

Otherwise, four and more resistance reducing wires may be used to constitute each of the touch sensing lines.

On the other hand, touch driving electrodes Tx1, Tx2, . . . , Tx8 constituting the touch sensor are arranged in the first direction (for example, x-axis direction) to cross over the first and second resistance reducing wires RxW1, RxW2 and RxW3; and RxW4, RxW5 and RxW6 between the touch sensing electrodes Rx11, Rx12 and Rx21, Rx22; Rx21, Rx22 and Rx31, Rx32; Rx31, Rx32 and Rx41, Rx42; Rx41, Rx42 and Rx51, Rx52; Rx51, Rx52 and Rx61, Rx62; Rx61, Rx62 and Rx71, Rx72; and Rx71, Rx72 and Rx81, Rx82. Each of the touch driving electrodes Tx1, Tx2, . . . , Tx8 further comprises a shielding portion TxS1 extending between the divided first and second touch sensing electrodes Rx11, Rx12 and Rx21, Rx22; Rx21, Rx22 and Rx31, Rx32; Rx31, Rx32 and Rx41, Rx42; Rx41, Rx42 and Rx51, Rx52; Rx51, Rx52 and Rx61, Rx62; Rx61, Rx62 and Rx71, Rx72; and Rx71, Rx72 and Rx81, Rx82. According to this configuration, a plurality of shielding portions TxS1 extending from the touch driving electrodes Tx1, Tx2, . . . , Tx8 are arranged in the spaces between the first touch sensing electrodes Rx11, Rx21, . . . , Rx81 and the second touch sensing electrodes Rx12, Rx22, . . . , Rx82 neighboring each other.

Another resistance reducing wires TxW1, TxW2, . . . , TxW8 are formed on the touch driving electrodes Tx1, Tx2, . . . , Tx8, respectively. Although FIG. 8 illustrates that the resistance reducing wires TxW1, TxW2, . . . , TxW8 are not formed at the shielding portions TxS1, the resistance reducing wires are preferably formed at the shielding portions TxS1, respectively, for resistance reduction. Also, the touch driving electrodes Tx1, Tx2, . . . , Tx8 are separated from each other, but they may be grouped into four units by the third to sixth resistance reducing wires TxW1 to TxW4 and the seventh to tenth resistance reducing wires TxW5 to TxW8 to form first touch driving lines Tx1 to Tx4 and TxW1 to TxW4 and second touch driving lines Tx5 to Tx8 and TxW5 to TxW8. The first touch driving lines Tx1 to Tx4 and TxW1 to TxW4 and the second touch driving lines Tx5 to Tx8 and TxW5 to TxW8 are connected to the power supply unit 15 via second routing wires TL1 and TL2 to receive a touch driving voltage Vtsp.

The touch sensor according to the second exemplary embodiment of this invention comprises the touch sensing electrodes Rx11, Rx21, . . . , Rx81; and Rx12, Rx22, . . . , Rx82, and the touch driving electrodes Tx1, Tx2, . . . , Tx8. Unit touch recognition blocks for touch recognition may be formed by appropriately grouping the touch sensing electrodes and the touch driving electrodes using the first and second resistance reducing wires and the third and fourth resistance reducing wires. FIG. 8 illustrates an example in which four unit touch recognition blocks TU11, 1112, TU21, and TU22 are formed by eight touch driving electrodes Tx1 to Tx8 and sixteen touch sensing electrode Rx11, Rx21, . . . , Rx81; and Rx12, Rx22, . . . , Rx82.

In more detail, the first touch recognition block TU11 is formed by the first touch sensing electrodes Rx11, Rx21, Rx31, and Rx41 and the first touch driving electrodes Tx1, Tx2, Tx3, and Tx4 which are connected to each other, the second touch recognition block TU12 is formed by the second touch sensing electrodes Rx12, Rx22, Rx32, and Rx42 and the first touch driving electrodes Tx1, Tx2, Tx3, and Tx4 which are connected to each other, the third touch recognition block TU21 is formed by the third touch sensing electrodes Rx51, Rx61, Rx71, and Rx81 and the second touch driving electrodes Tx5, Tx6, Tx7, and Tx8 which are connected to each other, and the fourth touch recognition block TU22 is formed by the fourth touch sensing electrodes Rx52, Rx62, Rx72, and Rx82 and the second touch driving electrodes Tx5, Tx6, Tx7, and Tx8 which are connected to each other.

All of the above-explained touch sensing electrodes Rx11, Rx21, . . . , Rx81; and Rx12, Rx22, . . . , Rx82 also serve as common electrodes COM and are formed on the first substrate SUB1 along with the pixel electrodes Px in a horizontal electrical field driving type display device. The pixel electrodes Px are formed in areas defined by the crossing of the gate lines G1 to Gm and the data lines D1 to Dn.

The touch sensing electrodes Rx11, Rx12, Rx21, Rx22, . . . , Rx81, Rx82 also serving as common electrodes COM may correspond one-to-one with unit pixel electrodes (each consisting of a plurality of subpixels required to represent colors), or one touch sensing electrode may correspond to n unit pixel electrodes (n is a natural number equal to or greater than 2).

As described above, in the touch sensor integrated type display device according to the second exemplary embodiment of the present invention, the touch sensing electrodes and the unit pixel electrodes may have a one-to-one or one-to-n relationship. Also, the first and second resistance reducing wires RxW1, RxW2, and RxW3; and RxW4, RxW5, and RxW6 may be correspond one-to-one with the data lines D1 to Dn, or one resistance reducing wire may correspond to n data lines. Also, the touch driving electrodes Tx1 to Tx8 may correspond one-to-one with the gate lines, or one touch driving electrode may correspond to n gate lines.

Accordingly, the touch sensor integrated type display device according to the second exemplary embodiment of the present invention has the advantage of facilitating the design of touch driving electrodes, touch sensing electrodes, and wiring which constitute a touch sensor, in conformity with the design of unit pixel electrodes, gate lines, and data lines of the display device.

Furthermore, the touch sensor integrated type display device according to the second exemplary embodiment of the present invention has the advantage of improving touch sensitivity by increasing mutual capacitance between touch driving electrodes and touch sensing electrodes because forming the touch driving electrodes and the touch sensing electrodes based on unit pixel electrodes can sharply increase their numbers.

Furthermore, the touch sensor integrated type display device according to the first exemplary embodiment of the present invention has the advantage of preventing light leakage caused by a liquid-crystal behavior which occurs due to an electric field formed between data lines and common electrodes (or pixel electrodes) by arranging shielding portions extending from touch driving electrodes in the spaces between divided common electrodes, i.e., the first and second touch driving electrodes, and shielding the electric field formed between the data lines and the common electrodes (touch sensing electrodes).

Next, with reference to FIGS. 7A and 7B, the touch sensor integrated type display device according to the second exemplary embodiment of the present invention will be described in more detail.

Figure 7A:
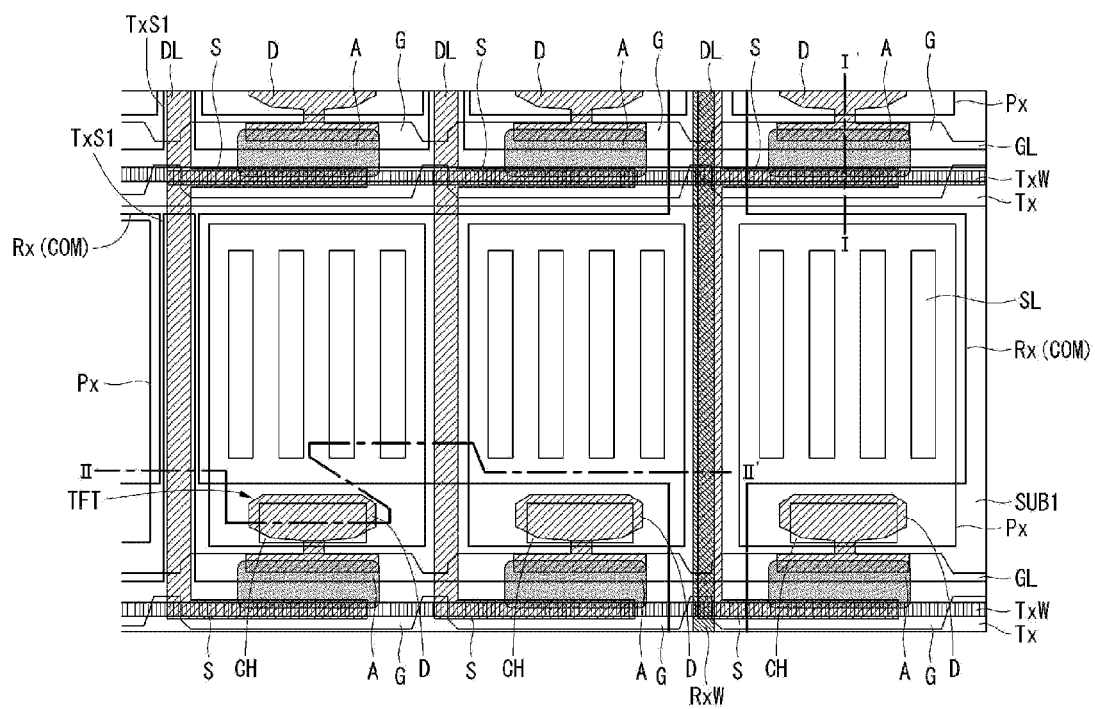
FIG. 7A is a top plan view illustrating part of the touch sensor integrated type display device according to the second exemplary embodiment of the present invention.
Figure 7B:
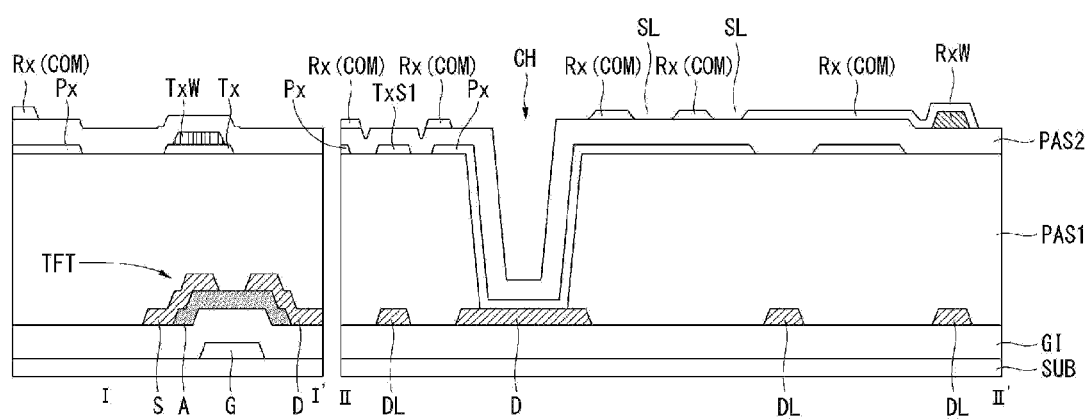
FIG. 7B is a cross-sectional view taken along the line I-I' and the line II-II shown in FIG. 7A.

With reference to FIGS. 7A and 7B, the touch sensor integrated type display device according to the second exemplary embodiment of the present invention comprises gate lines GL and data lines DL formed on substrate SUB 1 of a thin film transistor array TFTA to cross over each other, thin film transistors TFTs formed at crossings of the gate lines GL and the data lines DL, pixel electrodes Px formed in areas which are defined by crossings of the gate lines GL and the data lines DL, and common electrodes COM positioned opposite the pixel electrodes Px. In the second exemplary embodiment of the present invention, the common electrodes COM also serve as touch sensing electrodes Rx. Accordingly, the common electrodes COM are also referred to as touch sensing electrodes Rx, touch sensing electrodes Rx also serving as common electrodes, or common electrodes COM also serving as touch sensing electrodes as appropriate.

In this configuration, a thin film transistor TFT comprises a gate electrode G extending from a gate line GL, an active layer A formed in an area corresponding to the gate electrode G on a gate insulation layer GI covering the gate line GL and the gate electrode G, a data line DL formed on a first passivation layer PAS1 covering the active layer A, a source electrode S extending from the data line DL, and a drain electrode D positioned opposite the source electrode S. The thin film transistor thus formed is covered by the first passivation layer PAS1, and part of the drain electrode D of the thin film transistor TFT is exposed through a contact hole formed in the first passivation layer PAS1.

Although the second exemplary embodiment has been described with respect to a thin film transistor having a gate bottom structure where a gate electrode is formed under source/drain electrodes, the present invention is not limited thereto and it should be understood that the present invention also involves a thin film transistor having a gate top structure where a gate electrode is formed over source/drain electrodes. The thin film transistor having a gate top structure is a well-known component, so a detailed description thereof will be omitted.

The first passivation layer PAS1 is formed on the thin film transistors TFT and the data lines DL to cover them, and pixel electrodes Px are formed in pixel areas on the first passivation layer PAS1 which are defined by crossings of the gate lines GL and the data lines DL. The pixel electrodes Px are connected to the drain electrodes D of the thin film transistors TFT exposed through the first passivation layer PAS1. Also, touch driving electrodes Tx are formed in parallel with the gate lines GL on the first passivation layer PAS1 between the pixel electrodes Px neighboring each other with the gate lines GL interposed between them. The touch driving electrodes Tx may overlap the gate lines GL. The touch driving electrodes Tx comprise shielding portions TxS1 which overlap the data lines DL and extend along the data lines DL.

First and second resistance reducing wires (hereinafter referred to as 'driving electrode resistance reducing wires TxW') are formed on the touch driving electrodes Tx in parallel with the gate lines GL (along the x-axis) in the same direction (x-axis direction) as the touch driving electrodes Tx, thereby reducing the resistance of the touch driving electrodes Tx1 to Tx4; and Tx5 to Tx8.

A second passivation layer PAS2 is formed on the entire surface of the first passivation layer PAS1 on which the pixel electrodes Px, the touch driving electrodes Tx, and the driving electrode resistance reducing wires TxW are formed. Third and fourth resistance reducing wires (hereinafter referred to as 'sensing electrode resistance reducing wire RxW') are formed in parallel with the data lines GL (along the x axis) on the second passivation layer PAS2. The sensing electrode resistance reducing wires RxW may overlap the data lines DL. The sensing electrode resistance reducing wires RxW may correspond one-to-one with the data lines DL, or one sensing electrode resistance reducing wire RxW may correspond to n data lines (n is a natural number equal to or greater than 2).

In the embodiment shown in FIGS. 7A and 7B, the touch sensing electrodes Rx is formed on the second passivation layer PAS2, and the pixel electrodes Px is formed on the first passivation layer PAS1. But the invention is not limited thereto. For example, the touch sensing electrodes Rx is formed on the first passivation layer PAS1, and the pixel electrodes Px is formed on the second passivation layer PAS2. In this case, the touch sensing electrodes Rx may have slits, and the pixel electrodes Px may have no slits.

Touch sensing electrodes Rx also serving as common electrodes are formed on the second passivation layer PAS2 where the sensing electrode resistance reducing wires RxW are formed, to overlap the pixel electrodes Px and come into contact with the sensing electrode resistance reducing wires RxW. The touch sensing electrodes Rx also serving as common electrodes COM may correspond one-to-one with unit pixel electrodes (each consisting of a plurality of subpixels required to represent colors), or one touch driving electrode may correspond to n unit pixel electrodes (n is a natural number equal to or greater than 2). Also, each of the touch sensing electrodes Rx also serving as common electrodes may have a plurality of slits SL.

In the above-described configuration, the shielding portions TxS1 extending from the touch driving electrodes Tx are formed at positions overlapping the data lines DL. Accordingly, an electric field formed between the data lines DL and the touch sensing electrodes (common electrodes) Rx or an electric field formed between the data lines DL and the pixel electrodes Px does not affect the behavior of liquid crystals during a display driving operation. This prevents light leakage through the spaces between the divided common electrodes, i.e., the touch driving electrodes.

Hereinafter, touch sensing electrodes and touch driving electrodes, some having shielding portions, some having no shielding portions, will be described with reference to FIGS. 8A to 8D. FIGS. 8A to 8D are top plan views illustrating various examples of touch driving electrodes or touch sensing electrodes arranged in the areas R1 and R2 in the first and seconded exemplary embodiment of the present invention.

Figure 8A:
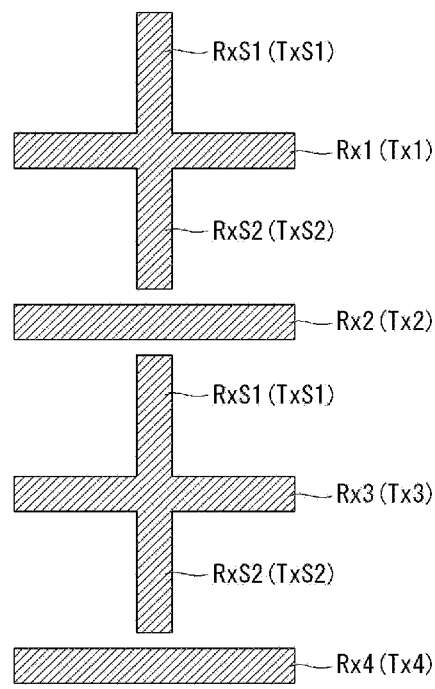
FIGS. 8A to 8D are top plan views illustrating various examples of touch driving electrodes or touch sensing electrodes arranged in the areas R1 and R2 in the first and second exemplary embodiments of the present invention.

With reference to FIG. 8A, among the touch sensing electrodes Rx1 to Rx4 and touch driving electrodes Tx1 to Tx4 arranged in the areas R1 and R2 of the touch sensor integrated type display device of the present invention, the odd-numbered touch sensing electrodes Rx1 and Rx3 or touch driving electrodes Tx1 and Tx3 have first and second shielding portions RxS1 and RxS2 or TxS1 and TxS2 that extend from them in two directions, and the even-numbered touch sensing electrodes Rx2 and Rx4 or touch driving electrodes Tx2 and Tx4 have no shielding portions.

Figure 8B:
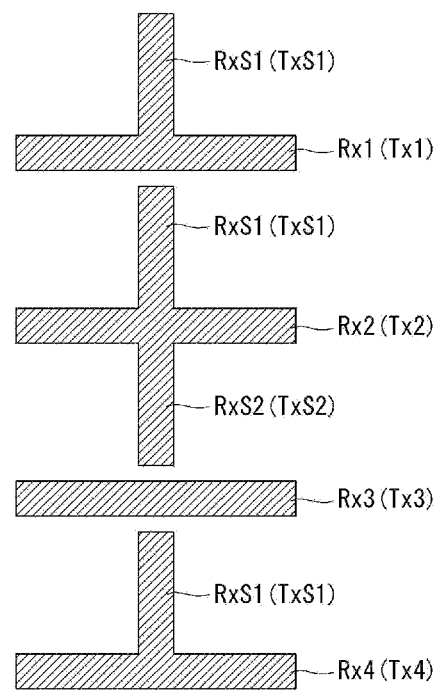

With reference to FIG. 8B, among the touch sensing electrodes Rx1 to Rx4 and touch driving electrodes Tx1 to Tx4 arranged in the areas R1 and R2 of the touch sensor integrated type display device of the present invention, the first touch sensing electrode Rx1 or touch driving electrode Tx1 has a first shielding portion RxS1 or TxS1 that extends from it in a first direction, the second touch sensing electrode Rx2 or touch driving electrode Tx2 has first and second shielding portion RxS1 and RxS2 or TxS1 and TxS2 that extend from it in two directions, the third touch sensing electrode Rx3 or touch driving electrode Tx3 has no shielding portion, and the fourth touch sensing electrode Rx4 or touch driving electrode Tx4 has a first shielding portion RxS1 or TxS1 that extends in the first direction.

Figure 8C:
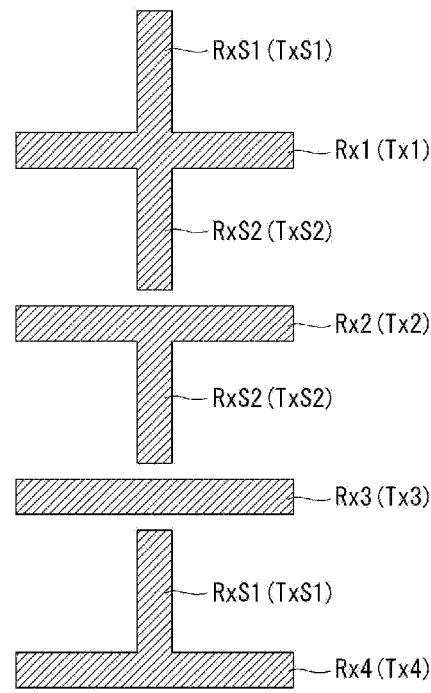

With reference to FIG. 8C, among the touch sensing electrodes Rx1 to Rx4 and touch driving electrodes Tx1 to Tx4 arranged in the areas R1 and R2 of the touch sensor integrated type display device of the present invention, the first touch sensing electrode Rx1 or touch driving electrode Tx1 has first and second shielding portion RxS1 and RxS2 or TxS1 and TxS2 that extend from it along the data lines in two directions, the second touch sensing electrode Rx2 or touch driving electrode Tx2 has a second shielding portion RxS2 or TxS2 that extends in a second direction, the third touch sensing electrode Rx3 or touch driving electrode Tx3 has no shielding portion, and the fourth touch sensing electrode Rx4 or touch driving electrode Tx4 has a first shielding portion RxS1 or TxS1 that extends in the first direction.

Figure 8D:
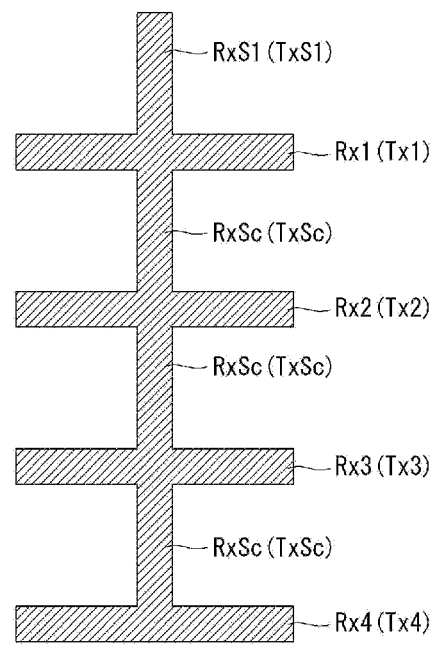

With reference to FIG. 8D, each of the touch sensing electrodes Rx1 to Rx4 and touch driving electrodes Tx1 to Tx4 arranged in the areas R1 and R2 of the touch sensor integrated type display device of the present invention has a third shielding portion that connects all of the touch sensing electrodes Rx1 to RxS4 or all of the touch driving electrodes Tx1 to Tx4, and the first touch sensing electrode Rx1 or touch driving electrode Tx1 has a first shielding portion RxS1 or TxS1 that extends in the first direction.

As can be seen from the examples shown in FIGS. 8A to 8D, shielding portions may be formed in various corresponding manners in the spaces between divided common electrodes. Accordingly, it should be understood that the present invention is not limited to the examples shown in FIGS. 8A to 8D and other combinations may be possible.

Those skilled in the art will recognize, after review of the foregoing detailed description, that variations and modifications are possible without departing from the spirit of the invention. For example, while the first and second exemplary embodiments of the present invention have been described with respect to an example where touch driving electrodes or touch sensing electrodes formed between pixel electrodes neighboring each other with gate lines interposed between them comprise resistance reducing wires, the resistance reducing wires are only required if the touch driving electrodes or touch sensing electrodes are made from transparent metals having high-specific resistance such as ITO, IZO, and GZO but not required if the touch driving electrodes or touch sensing electrodes are made from metal materials. In this case, the touch driving electrodes or touch sensing electrodes are connected directly to the routing wires.

In addition, while the touch driving electrodes or touch sensing electrodes also serving as common electrodes and the unit pixels have a one-to-one or one-to-n relationship (n is a natural number equal to or greater than 2), they do not necessarily correspond to the unit pixels but may correspond to two or more subpixels.

Accordingly, the technical scope of the present invention is not limited to the detailed description of the specification, but should be defined by the accompanying claims.

What is claimed is:

1. A touch sensor integrated type display device, comprising:
    a plurality of gate lines and a plurality of data lines that cross over each other;
    a plurality of pixel electrodes formed in areas defined by crossings of the gate lines and the data lines;
    a plurality of first electrodes each including a plurality of first electrode patterns that are arranged in parallel with the gate lines, wherein the first electrode patterns neighbored to each other are connected to be arranged in parallel with the data lines by at least one connection portion;
    a plurality of second electrodes that are arranged in parallel with the gate lines between the pixel electrodes neighboring each other and cross over the at least one connection portion;
    a passivation layer formed between the first electrodes and the second electrodes; and
    shielding portions configured to shield a first electric field formed between the data lines and a first region between the adjacent first electrodes and a second region between the data lines and the adjacent pixel electrodes such that the second region is corresponded to the first region, the shielding portions extending from the second electrodes in spaces between the first electrode patterns.

2. The touch sensor integrated type display device of claim 1, comprising:
    a gate insulation layer that covers the gate lines formed in parallel with each other on a first substrate;
    the plurality of data lines that cross over the gate lines on the gate insulation layer;
    a plurality of thin film transistors that are respectively formed in a plurality of pixel areas defined by the crossings of the gate lines and the data lines;
    a first passivation layer that covers the thin film transistors;
    the plurality of first electrodes formed on the first passivation layer and formed in at least two pixel areas;
    a second passivation layer that covers the first electrodes;
    the plurality of pixel electrodes that are respectively formed in the pixel areas on the second passivation layer and at least partially overlap the first electrodes; and
    the plurality of second electrodes formed on the second passivation layer and in parallel so as to at least partially overlap the gate lines.

3. The touch sensor integrated type display device of claim 1, where the first electrodes are touch driving electrodes also serving as common electrodes, and the second electrodes are touch sensing electrodes.

4. The touch sensor integrated type display device of claim 1, where the first electrodes are touch sensing electrodes also serving as common electrodes, and the second electrodes are touch driving electrodes.

5. The touch sensor integrated type display device of claim 1, further comprising at least one first electrode resistance reducing wire that overlaps each of the first electrodes along the direction of the first electrodes and reduces the resistance of each of the first electrodes.

6. The touch sensor integrated type display device of claim 1, further comprising at least one second electrode resistance reducing wire that overlaps each of the second electrodes along the direction of the second electrodes and reduces the resistance of each of the second electrodes.

7. The touch sensor integrated type display device of claim 1, further comprising at least one shielding portion resistance reducing wire that overlaps each of the shielding portions along the direction of the shielding portions and reduces a resistance of each of the shielding portions.

8. A touch sensor integrated type display device, comprising:
    a plurality of gate lines and a plurality of data lines that cross over each other;
    a plurality of pixel electrodes formed in areas defined by crossings of the gate lines and the data lines;

a plurality of first electrodes that are arranged in parallel with the gate lines between the pixel electrodes neighboring each other;

a plurality of second electrodes each including a plurality of second electrode patterns that are arranged in parallel with the gate lines, wherein second electrode patterns neighbored to each other are connected to be arranged in parallel with the data lines by at least one connection portion crossing over the first electrode;

a passivation layer formed between the first electrodes and the second electrodes; and shielding portions configured to shield a first electric field formed between the data lines and a first region between the adjacent first electrodes and a second region between the data lines and the adjacent pixel electrodes such that the second region is corresponded to the first region, the shielding portions extending from the second electrodes in spaces between the first electrode patterns.

9. The touch sensor integrated type display device of claim 8, comprising:

a gate insulation layer that covers the gate lines formed in parallel with each other on a first substrate;

the plurality of data lines that cross over the gate lines on the gate insulation layer;

a plurality of thin film transistors that are respectively formed in a plurality of pixel areas defined by the crossings of the gate lines and the data lines;

a first passivation layer that covers the thin film transistors;

the plurality of pixel electrodes that are respectively formed in the pixel areas on the first passivation layer and respectively connected to the thin film transistors;

the plurality of first electrodes formed on the first passivation layer and in parallel so as to at least partially overlap the gate lines;

a second passivation layer that covers the pixel electrodes and the first electrodes; and the plurality of second electrodes formed on the second passivation layer, and in at least two pixel areas.

10. The touch sensor integrated type display device of claim 8 where the first electrodes are touch driving electrodes, and the second electrodes are touch sensing electrodes also serving as common electrodes.

11. The touch sensor integrated type display device of claim 8, where the first electrodes are touch sensing electrodes, and the second electrodes are touch driving electrodes also serving as common electrodes.

12. The touch sensor integrated type display device of any one of claim 8, further comprising at least one first electrode resistance reducing wire that overlaps each of the first electrodes along the direction of the first electrodes and reduces the resistance of each of the first electrodes.

13. The touch sensor integrated type display device of claim 8, further comprising at least one second electrode resistance reducing wire that overlaps each of the second electrodes along the direction of the second electrodes and reduces the resistance of each of the second electrodes.

14. The touch sensor integrated type display device of claim 8, further comprising at least one shielding portion resistance reducing wire that overlaps each of the shielding portions along the direction of the shielding portions and reduces a resistance of each of the shielding portions.

* * * * *